H. F. RUGGLES.
TRACTOR COUPLING FOR SUGAR CARTS.
APPLICATION FILED MAR. 28, 1918.
1,398,575.
Patented Nov. 29, 1921.
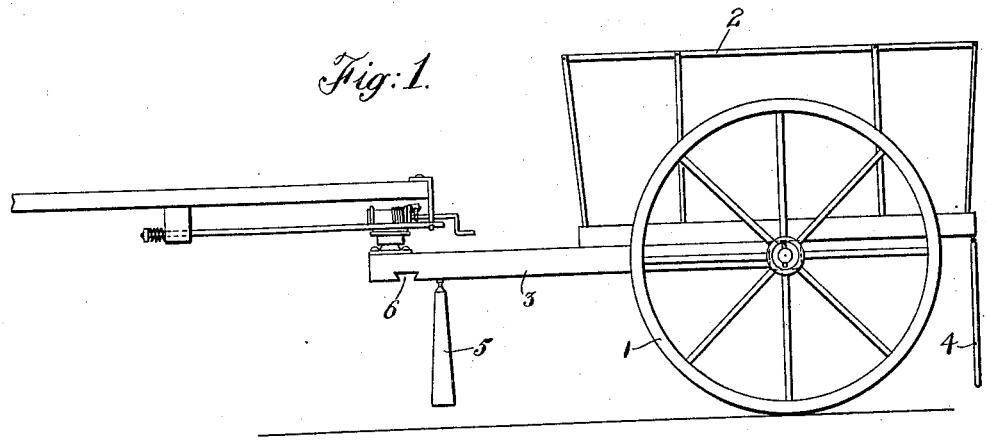
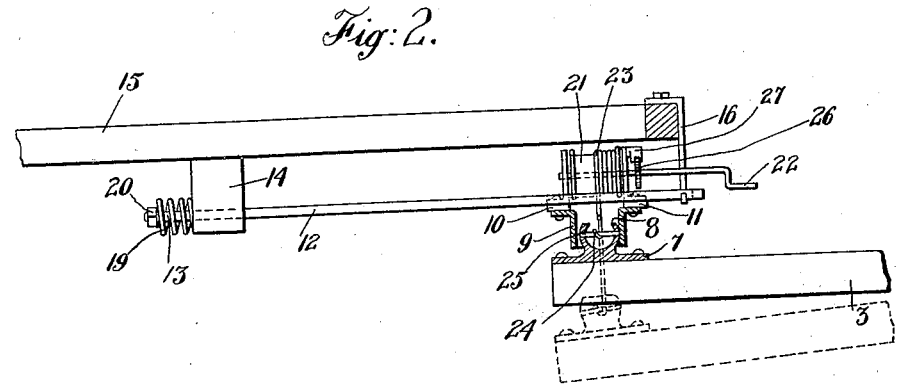
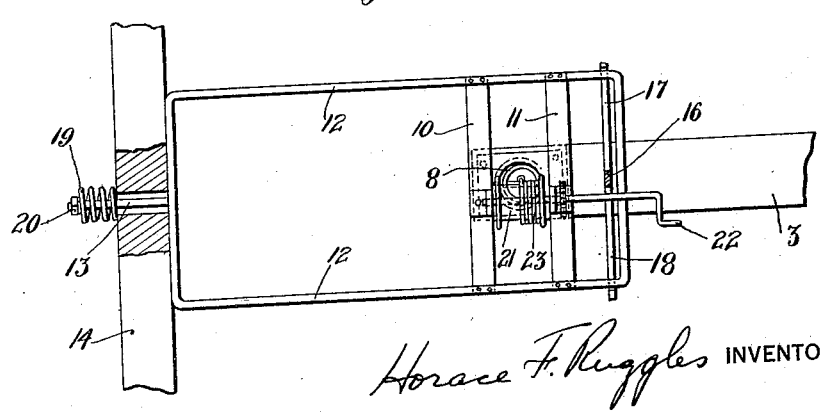
Horace F. Ruggles INVENTOR
BY
Thomas Howe ATTORNEY

UNITED STATES PATENT OFFICE.

HORACE F. RUGGLES, OF WEST ENGLEWOOD, NEW JERSEY.

TRACTOR-COUPLING FOR SUGAR-CARTS.

1,398,575.  Specification of Letters Patent.  Patented Nov. 29, 1921.

Application filed March 28, 1918. Serial No. 225,185.

*To all whom it may concern:*

Be it known that I, HORACE F. RUGGLES, a citizen of the United States of America, residing at West Englewood, Bergen county, State of New Jersey, have invented new and useful Improvements in Tractor-Couplings for Sugar-Carts, of which the following is a specification.

This invention relates to traction couplings and is especially adapted for securing sugar carts of the type by which sugar cane is drawn from the fields to a tractor or other means by which the cart is to be drawn.

The carts by which cane is drawn from the field, have been in use for many years and to be practically successful, any traction apparatus for these carts which is to be substituted for the usual teams of bullocks, must be readily adaptable to the sugar cart as it exists. Otherwise the prejudice occasioned by long use of these carts would prevent the general adaption of the device and render it substantially useless in practice whatever its merits as an engineering proposition might be. A cart, as referred to, is supported on two wheels whereon is mounted a body or crate adapted to receive the cane, and is so adjusted on the axle that it will usually tend to depress the tongue which extends forwardly from the cart. The forward end of the tongue is lashed to a bar or beam of wood which extends transversely of it and it in turn has its ends lashed to the horns of the cattle. During the usual drawing of the loaded cart therefor, the tongue bears upon the heads of the cattle. It is possible, however, that with certain conditions of grades, the cart may tend to tip backwardly and for this reason a hanging prop is suspended from the rear of the cart. When the cattle are removed from the cart, a swinging prop depending from the underside of the tongue near its forward end will support the latter so that the body will be maintained in a substantially horizontal position. In fact the prop supports the tongue as a general thing whenever it is stopped, even if the cattle are attached to it, as they immediately lower their heads and allow the tongue to rest on the prop. In the normal drawing of the cart, however, the prop swings clear of the ground.

It is the main object of the invention to utilize the carts now in common use in the cane fields and as nearly as possible to parallel the use of cattle with a tractor. Accordingly the invention contemplates a device whereby the tractor may be secured to the sugar cart from the usual position of rest of the latter and whereby the coupling may be readily and reliably effected and the operation of the cart take place the same as if drawn by cattle in the usual way.

Other and ancillary objects of the invention will appear hereinafter.

In the accompanying drawings, which illustrate the invention,

Figure 1 is a side elevation of the rear end of a tractor and a cane cart secured together by a coupling embodying the invention;

Fig. 2 is a view similar to Fig. 1 on an enlarged scale of the rear of the tractor, the forward end of the cart tongue and the coupling therebetween, certain of the parts being shown in section, and Fig. 3 is a top plan view of the apparatus of Fig. 2.

Referring to the drawings, the cart comprises two wheels 1, upon the axle of which is mounted the crate or body 2 for receiving the cane, this body being so placed on the axle between the walls that it has a forward bias as herein before referred to. Extending forwardly of the axle from the cart, is a tongue 3. At the rear of the cart is a prop 4, ordinarily clearing the ground, but which will prevent the cart from tipping backwardly too far. Pivotally hung beneath the forward end of the tongue 3 is a swing prop 5 adapted to rest upon the ground to hold up the tongue when the latter is released from the pulling means, but which ordinarily clears the ground. Also the tongue usually has a transverse slot 6 through which the lashing for securing the bar or yoke by which the cattle pull, to the tongue.

My improved coupling comprises a member having a base plate 7 securely bolted to the upper side of the cart tongue while projecting upwardly from this base plate is a globular projection 8. Preferably this globular projection is hollow as shown and has an opening in its top for a purpose as will be hereinafter described. The draft engagement is formed by entering this globular projection within a cylindrical socket member 9 which is mounted on the cross pieces 10 and 11, which extend across from one side to the other of the frame 12. This frame 12 is supported by means of a projection 13 which may be integral with the frame and which extends through an opening in the beam or bar 14 secured to the rear end 15 of the tractor. The other end of the frame 12 may be supported by means of a T shaped piece, the middle limb 16 of which is secured to the rear portion 15 of the tractor whence it extends vertically to the other two limbs 17 and 18 which extend horizontally and beneath the frame 12, so that the latter is supported thereby without interfering with a small forward and backward sliding of the frame. The frame can move forward until it comes against the bar 14, while its movement in the other direction is opposed by a spring 19 interposed between a nut 20 upon the end of the projection 13 and the bar 14.

Also mounted upon the cross bars 10 and 11 of the frame, is a winch 21 operated by means of a handle 22. Upon the drum of this winch is wound a cable or rope 23 having a hook 24 at its end. The winch is so placed with relation to the member 9, that the hook and cable pass through this member as the cable is reeled up or payed out. The hook is adapted to enter in the opening of the tube of the globular projection 8 and engage with a bar 25 extending across its interior.

If, now, the cart is considered as standing by itself, the tongue will be supported by the prop 5. The rear end of the tractor is then so positioned as to be over the forward end of the tongue. The hook is then pulled through the cylindrical member 9, passed into the top of the globular projection 8 and hooked to the bar 25. The handle 22 is then turned to reel up the cable when the prop 5 will be lifted clear of the ground and the projection 8 drawn into the socket piece 9. The winch may be secured in this position by means of a ratchet 26 on the shaft of the winch which is engaged by a pawl 27 pivoted on the tractor. It will be observed that by this arrangement the globular projection is drawn into the socket piece even if they are not in registry when the coupling operation is begun. This is important as it does not require such accurate placing of the tractor in order to effect the coupling. In other words, the tractor and cart are brought into approximately the coupling position, the cable is then hooked as described, when the winch will draw the parts together. It will be further observed that the tension upon the cable and winch after the parts have been coupled, is only required to hold the coupling parts in engagement. None of the draft comes on this cable, this being taken up through the abutment of the parts 8 and 9, while the globular form of the projection 8 engaging in the socket piece permits relative movement of the parts after the manner of a ball and socket joint as the tractor and cart adjust themselves to inequalities in the ground, so that straining of the parts is avoided.

While the invention has been illustrated in what are considered its best application, it may have other embodiments without departing from its spirit, and is not, therefore, limited to the structure shown in the drawings, the appended claims pointing out the invention in accordance with the patent statutes.

What I claim is—

1. The combination with a drawn unit having a tongue, of a drawing member, a draft coupling between said tongue and member comprising a socket piece and projection on the tongue and member respectively, said projection and socket piece being movable into and out of engaging relation and taking the draft pull between said tongue and member when in engaging relation, and a winch and cable for drawing the projection into the socket.

2. The combination with a drawn unit having a tongue, of a drawing member, a draft coupling between said tongue and member comprising a socket piece and projection on the tongue and member respectively, said projection and socket piece being movable into and out of engaging relation and taking the draft pull between said tongue and member when in engaging relation, and a winch and cable for drawing the projection into the socket, the cable being drawn through the socket.

3. The combination with a drawn unit having a tongue, of a drawing member, a draft coupling between said tongue and member comprising abutments on the tongue and member respectively, said abutments, being movable into and out of engaging relation and taking the draft pull between said tongue and member when in engaging relation, and a winch and cable for drawing the abutments into engaging relation, said winch and one of said abutments being mounted upon a longitudinally yieldable support.

4. The combination with a drawn unit having a tongue, of a drawing member, a draft coupling between said tongue and member comprising a socket member and a spherical projection respectively mounted on said tongue and drawing member, a cable and winch therefor, said cable extending through said socket member and engaging said spherical projection.

In testimony whereof I have signed this specification this 21st day of March, 1918.

HORACE F. RUGGLES.